United States Patent
Yamashita et al.

(10) Patent No.: US 12,092,511 B2
(45) Date of Patent: Sep. 17, 2024

(54) BLADE VIBRATION MONITORING DEVICE, BLADE VIBRATION MONITORING SYSTEM, MOVING BLADE, AND ROTARY MACHINE

(71) Applicant: Mitsubishi Hitachi Power Systems, Ltd., Kanagawa (JP)

(72) Inventors: Hiroyuki Yamashita, Tokyo (JP); Kazuhiro Tamura, Tokyo (JP); Keiichiro Miyajima, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 351 days.

(21) Appl. No.: 16/617,268

(22) PCT Filed: May 30, 2018

(86) PCT No.: PCT/JP2018/020747
§ 371 (c)(1),
(2) Date: Nov. 26, 2019

(87) PCT Pub. No.: WO2018/221577
PCT Pub. Date: Dec. 6, 2018

(65) Prior Publication Data
US 2021/0131861 A1    May 6, 2021

(30) Foreign Application Priority Data

May 31, 2017    (JP) .................. 2017-107663

(51) Int. Cl.
*F01D 25/00*    (2006.01)
*G01H 1/00*    (2006.01)

(52) U.S. Cl.
CPC ............. *G01H 1/003* (2013.01); *F01D 25/00* (2013.01); *F05D 2260/80* (2013.01)

(58) Field of Classification Search
CPC .......... F01D 25/00; F01D 21/04; F01D 21/14; F01D 21/003; F01D 5/225; F01D 5/10;
(Continued)

(56) References Cited

U.S. PATENT DOCUMENTS 5,097,711 A * 3/1992 Rozelle .................. G01H 1/006
73/660
5,365,663 A * 11/1994 Demartini .................. G01P 3/49
29/889.21

(Continued)

FOREIGN PATENT DOCUMENTS

EP    1 126 254    8/2001
JP    4-339107    11/1992
(Continued)

OTHER PUBLICATIONS

International Search Report issued Aug. 28, 2018 in International (PCT) Application No. PCT/JP2018/020747, with English-language translation.
(Continued)

*Primary Examiner* — Brian P Wolcott
(74) *Attorney, Agent, or Firm* — Wenderoth, Lind & Ponack, L.L.P.

(57) ABSTRACT

A blade vibration monitoring device includes: a rotary machine including a rotating shaft that extends along an axis, and a plurality of moving blades having moving blade bodies that extend radially outward in a radial direction from the rotating shaft, and shrouds that are provided at tips of the moving blade bodies and are in contact with each other in a circumferential direction; and a sensor that is provided on the outside of the shroud in the radial direction to face the shroud, and is configured to detect a change in an outer circumferential surface of the shroud, in which the outer circumferential surface of the shroud includes a first surface, and a second surface which is disposed to be interposed
(Continued)

between the first surfaces from both sides in the circumferential direction, and in which a detection signal from the sensor is different from that of the first surface.

1 Claim, 9 Drawing Sheets

(58) Field of Classification Search
CPC .. F01D 5/14; F01D 5/26; G01H 1/003; G01H 1/10; G01H 17/00; F05D 2260/80; F05D 2250/182; F05D 2250/314; F05D 2250/323; F05D 2250/324; F05D 2270/334; F05D 2270/304; F05D 2220/31
See application file for complete search history.

(56) References Cited

U.S. PATENT DOCUMENTS

| | | | |
|---|---|---|---|
| 5,440,395 A | 8/1995 | Makita | |
| 7,341,428 B2* | 3/2008 | Twerdochlib | G01H 9/00 |
| | | | 416/61 |
| 7,861,592 B2* | 1/2011 | Twerdochlib | F01D 5/225 |
| | | | 73/660 |
| 7,987,725 B2* | 8/2011 | Twerdochlib | G01H 1/08 |
| | | | 73/661 |
| 8,096,184 B2* | 1/2012 | Twerdochlib | G01H 1/003 |
| | | | 73/660 |
| 2006/0000283 A1 | 1/2006 | Twerdochlib | |
| 2006/0171806 A1 | 8/2006 | Twerdochlib | |
| 2008/0206057 A1 | 8/2008 | Twerdochlib | |
| 2016/0053772 A1 | 2/2016 | Lofy et al. | |
| 2017/0082116 A1 | 3/2017 | Nibu et al. | |

FOREIGN PATENT DOCUMENTS

| | | |
|---|---|---|
| JP | 6-10612 | 1/1994 |
| JP | 10-104055 | 4/1998 |
| JP | 11-14446 | 1/1999 |
| JP | 3038382 | 5/2000 |
| JP | 5293406 | 9/2013 |

OTHER PUBLICATIONS

Written Opinion of the International Searching Authority issued Aug. 28, 2018 in International (PCT) Application No. PCT/JP2018/020747, with English-language translation.

* cited by examiner

BLADE VIBRATION MONITORING DEVICE, BLADE VIBRATION MONITORING SYSTEM, MOVING BLADE, AND ROTARY MACHINE

TECHNICAL FIELD

The present invention relates to a blade vibration monitoring device, a blade vibration monitoring system, a moving blade, and a rotary machine.

Priority is claimed on Japanese Patent Application No. 2017-107663, filed on May 31, 2017, the content of which is incorporated herein by reference.

BACKGROUND ART

For example, a manager of a rotary machine, such as a turbine, monitors vibrations generated in a moving blade during a turbine operation using a blade vibration monitoring device. The manager verifies whether or not the vibration characteristics of the moving blade are as designed according to such monitoring. In addition, the manager performs such monitoring, confirms changes in vibration characteristics of the moving blade due to changes in operating conditions, and improves the reliability of the turbine.

CITATION LIST

Patent Literature

[Patent Document 1] Japanese Patent No. 3038382

DISCLOSURE OF INVENTION

Technical Problem

Incidentally, there is a case where a non-contact blade vibration measurement technique described above is applied to a moving blade having a shroud (tip shroud) at an end portion on the outside in the radial direction. As described above, in a case of analyzing the vibration of the moving blade through the shroud, since an outer circumferential surface of the shroud is flat, it is necessary to detect the passage of the gap (reference numeral G in FIG. 3) between the shrouds adjacent to the sensor in the circumferential direction. However, since the gap between the shrouds is extremely small, there is a problem that it is difficult for the sensor to clearly acquire a detection signal that represents the passage of the gap.

An object of the present invention is to provide a blade vibration monitoring device that can stably measure vibration of a moving blade having a shroud, a blade vibration monitoring system, a moving blade, and a rotary machine.

Solution to Problem

According to a first aspect of the present invention, there is provided a blade vibration monitoring device including: a rotary machine including a rotating shaft that extends along an axis, and a plurality of moving blades having moving blade bodies that extend radially outward in a radial direction from the rotating shaft, and shrouds that are provided at tips of the moving blade bodies and are in contact with each other in a circumferential direction; and a sensor that is provided on the outside of the shroud in the radial direction to face the shroud, and is configured to detect a change in an outer circumferential surface of the shroud, in which the outer circumferential surface of the shroud includes a first surface, and a second surface which is disposed to be interposed between the first surface from both sides in the circumferential direction, and in which a detection signal from the sensor is different from that of the first surface.

According to such a configuration, since the detection signals detected by the sensor are different from each other between the first surface and the second surface of the shroud, compared to a method for detecting the gap between the shrouds, it is possible to stably perform measurement of vibration of the moving blade having the shroud.

In the blade vibration monitoring device, the second surface may be formed such that a width in the circumferential direction gradually increases toward at least one of an upstream side and a downstream side in an axial direction.

According to such a configuration, the position of the shroud in the axial direction can be specified based on the length of time for the second surface to pass through the inside of the sensor in the radial direction.

In the blade vibration monitoring device, the second surface may be formed such that a width in the circumferential direction increases stepwise toward at least one of an upstream side and a downstream side in an axial direction.

According to such a configuration, the position of the shroud in the axial direction can be specified based on the length of time for the second surface to pass through the inside of the sensor in the radial direction. In addition, the length of time for the second surface to pass through the inside of the sensor in the radial direction can be changed discretely.

In the blade vibration monitoring device, the second surface may be formed to have a height in the radial direction different from that of the first surface.

According to such a configuration, it is possible to more easily form a structure in which the detection signals from the sensor are different from each other between the first surface and the second surface.

In the blade vibration monitoring device, the second surface may be formed of a metal different from that of the first surface.

According to such a configuration, the outer circumferential surface of the shroud can be made flat. Accordingly, disturbance of a working fluid can be suppressed. Further, the second surface can be detected using the sensor that can detect an object in an electric field by generating the electric field.

According to a second aspect of the present invention, there is provided a blade vibration monitoring system including: a rotary machine including a rotating shaft that extends along an axis, and a plurality of moving blades having a plurality of moving blade bodies that extend radially outward in a radial direction from the rotating shaft, and shrouds that are provided at tips of the moving blade bodies and are in contact with each other in a circumferential direction; a sensor that is provided on the outside of the shroud in the radial direction to face the shroud, and is configured to detect a change in an outer circumferential surface of the shroud; and a calculation unit that is configured to calculate a vibration amount of the shroud based on a detection signal of the sensor, in which the outer circumferential surface of the shroud includes a first surface, and a second surface which is disposed to be interposed between the first surfaces from both sides in the circumferential direction, and in which a detection signal from the sensor is different from that of the first surface, and in which the calculation unit is configured to calculate the vibration amount of the shroud in the circumferential direction based on a length of time for the first surface to pass through the inside of the sensor in the radial direction.

In the blade vibration monitoring system, the second surface may be formed such that a width in the circumferential direction gradually increases toward one side in an axial direction, and the calculation unit may calculate the vibration amount of the shroud in the axial direction based on the length of time for the second surface to pass through the inside of the sensor in the radial direction.

According to a third aspect of the present invention, there is provided a moving blade of a rotary machine including a rotating shaft that extends along an axis and a plurality of moving blades, including: a moving blade body that extends radially outward in a radial direction from the rotating shaft; and a shroud that is provided at a tip of the moving blade body and comes into contact with each other in a circumferential direction, in which the outer circumferential surface of the shroud includes a first surface, and a second surface which is disposed to be interposed between the first surfaces from both sides in the circumferential direction, and in which a boundary with the first surface is inclined toward at least one of an upstream side and a downstream side in an axial direction.

In the moving blade, the second surface may be formed such that a width in the circumferential direction gradually increases toward at least one of an upstream side and a downstream side in an axial direction.

In the moving blade, the second surface may be formed such that a width in the circumferential direction increases stepwise toward at least one of an upstream side and a downstream side in an axial direction.

In the moving blade, the second surface may be formed to have a height in the radial direction different from that of the first surface.

In the moving blade, the second surface may be formed of a metal different from that of the first surface.

According to a fourth aspect of the present invention, there is provided a rotary machine including a blade vibration monitoring device, the machine including: a rotating shaft that extends along an axis; a plurality of moving blades having moving blade bodies that extend radially outward in a radial direction from the rotating shaft, and a shroud that is provided at a tip of the moving blade body and comes into contact with each other in a circumferential direction; and a sensor that is provided on the outside of the shroud in the radial direction to face the shroud, and is configured to detect a change in an outer circumferential surface of the shroud, in which the outer circumferential surface of the shroud includes a first surface, and a second surface which is disposed to be interposed between the first surfaces from both sides in the circumferential direction, and in which a detection signal from the sensor is different from that of the first surface.

Advantageous Effects of Invention

According to the present invention, since the detection signals detected by the sensor are different from each other between the first surface and the second surface of the shroud, compared to a method for detecting the gap between the shrouds, it is possible to stably perform measurement of vibration of the moving blade having the shroud.

DETAILED DESCRIPTION OF THE INVENTION

First Embodiment

Hereinafter, a blade vibration monitoring device and a blade vibration monitoring system according to a first embodiment of the present invention will be described with reference to the drawings. The blade vibration monitoring device is, for example, a device including a rotary machine such as a turbine and a sensor necessary for monitoring the vibration of the moving blade, and the blade vibration monitoring system is a system in which an analysis device added to a blade vibration monitoring device 100.

Figure 1:
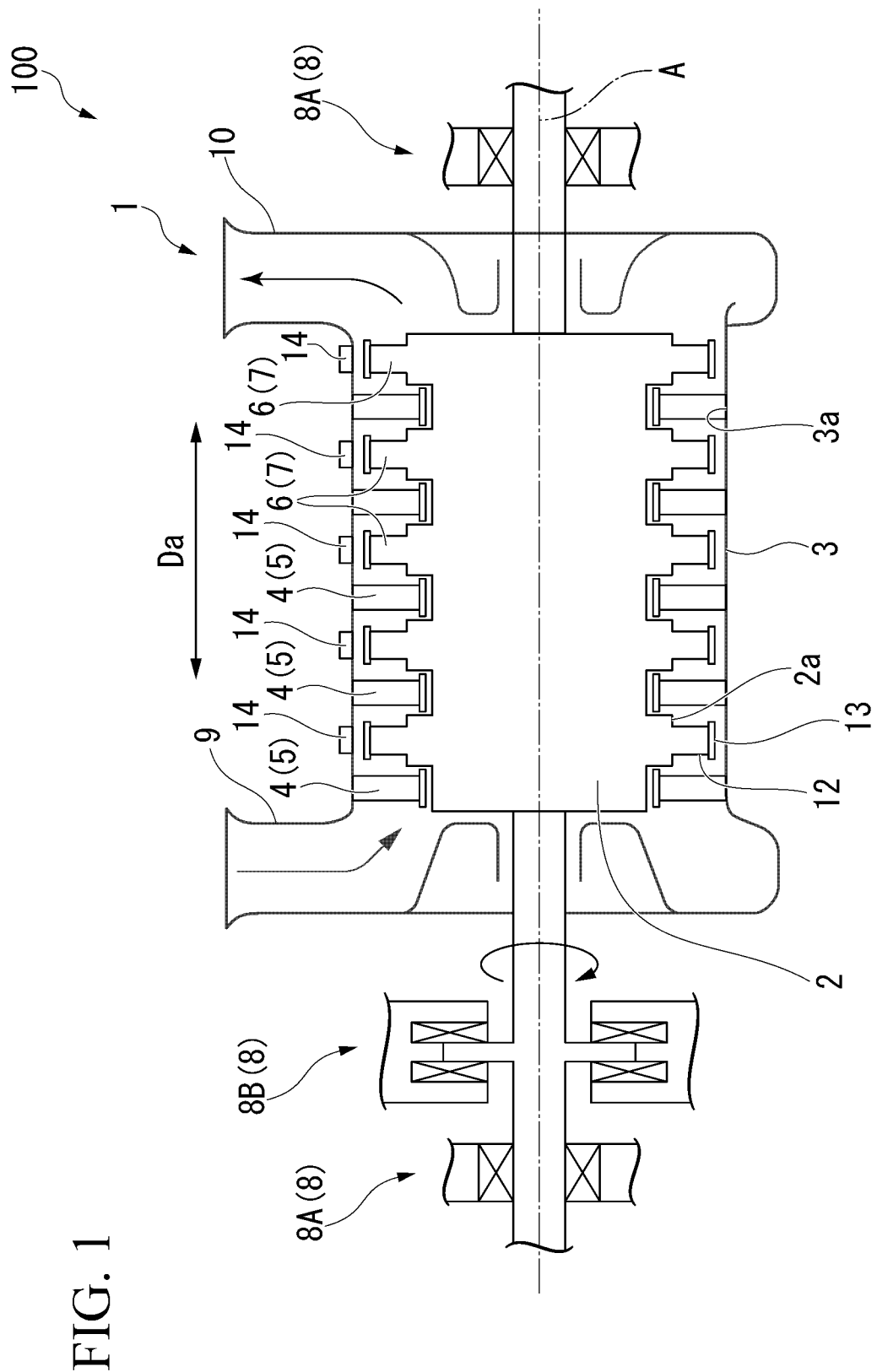
FIG. 1 is a view showing a configuration of a turbine of a first embodiment of the present invention.

As shown in FIG. 1, the blade vibration monitoring device 100 of the present embodiment includes a turbine 1 that is a rotary machine and a plurality of displacement sensors 14.

The turbine 1 includes a rotating shaft 2, a casing 3, a turbine vane stage 4 including a plurality of turbine vanes 5, and a moving blade stage 6 including a plurality of moving blades 7.

Figure 2:
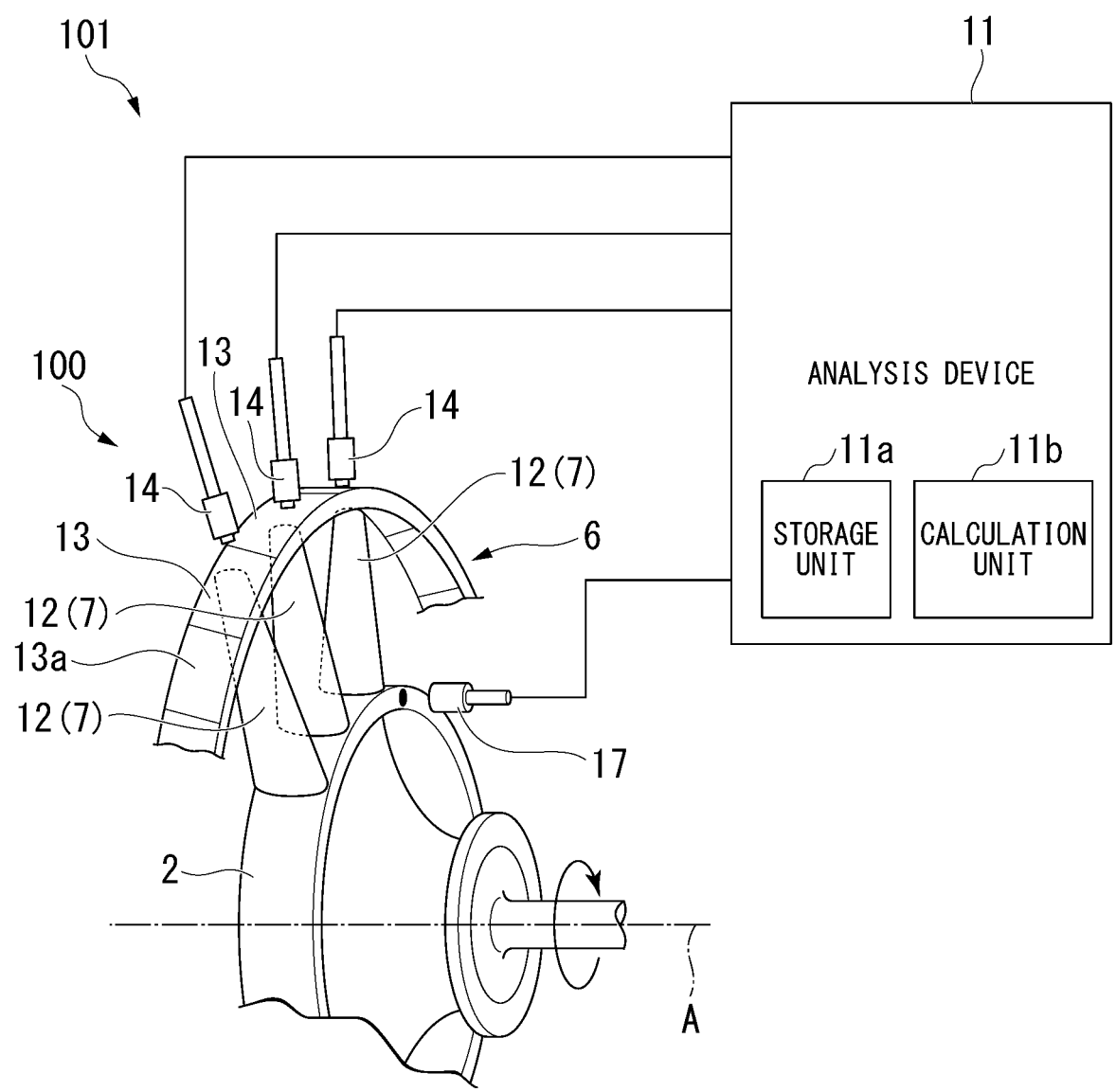
FIG. 2 is a view showing a blade vibration monitoring system of the first embodiment of the present invention.

As shown in FIG. 2, a blade vibration monitoring system 101 of the present embodiment includes an analysis device 11 in addition to the blade vibration monitoring device 100.

The rotating shaft 2 has a columnar shape that extends along an axis A. The rotating shaft 2 is supported at both end portions in an axial direction Da along the axis A by a bearing device 8 so as to be rotatable around the axis.

In addition, in the following description, a direction in which the axis A of the rotating shaft 2 extends is taken as the axial direction Da. A direction orthogonal to the axis A is a radial direction, a side away from the axis A in the radial direction is called an outside in a radial direction, and a side approaching the axis A in the radial direction is called an inside in the radial direction.

The bearing device 8 includes journal bearings 8A provided one by one on both sides of the rotating shaft 2 in the axial direction Da, and a thrust bearing 8B provided only on one side in the axial direction Da. The journal bearing 8A supports a load in the radial direction by the rotating shaft 2. The thrust bearing 8B supports a load in the axial direction Da by the rotating shaft 2.

The casing 3 has a cylindrical shape that extends in the axial direction Da. The casing 3 covers the rotating shaft 2 from an outer circumferential side.

The casing 3 includes an intake port 9 and an exhaust port 10. The intake port 9 is formed on the upstream side (right side in FIG. 1) of the casing 3 in the axial direction Da, and takes in steam (working fluid) into the casing 3 from the outside. The exhaust port 10 is formed on the downstream side of the casing 3 in the axial direction Da, and exhausts the steam that has passed through the casing 3 to the outside.

In the following description, in the axial direction Da, a side where the intake port 9 is positioned when viewed from the exhaust port 10 is referred to as an upstream side, and a side where the exhaust port 10 is positioned when viewed from the intake port 9 is referred to as a downstream side.

The turbine vane stage 4 is provided with a plurality of stages on an inner circumferential surface 3a of the casing 3 at intervals along the axial direction Da. Each of the turbine vane stages 4 is disposed on the upstream side of each of the moving blade stages 6. Each of the turbine vane stages 4 has the plurality of turbine vanes 5 that are arranged at intervals in the circumferential direction of the axis A and extend radially outward in the radial direction from the rotating shaft 2.

The turbine vane 5 is provided so as to extend inward in the radial direction from the inner circumferential surface 3a of the casing 3. The turbine vane 5 has a blade-shaped section when viewed from the radial direction.

The moving blade stage 6 is provided with a plurality of stages on an outer circumferential surface 2a of the rotating shaft 2 at intervals along the axial direction Da. Each of the moving blade stages 6 includes a plurality of moving blades 7 arranged at intervals in the circumferential direction of the axis on the outer circumferential surface 2a of the rotating shaft 2.

As shown in FIG. 2, among the plurality of moving blade stages 6, each of the plurality of moving blades 7 that configure the moving blade stage 6 having at least one stage has a moving blade body 12 and a shroud 13 (tip shroud) fixed to a blade end of the moving blade body 12.

The moving blade body 12 is formed to extend outward in the radial direction from the rotating shaft 2. The moving blade body 12 has a blade-shaped section when viewed from the radial direction.

The shroud 13 is provided at the end portion on the outside of the moving blade body 12 in the radial direction. The shroud 13 has a plate shape having a predetermined thickness in the radial direction. The shroud 13 is integrally fixed to the blade body 12 so as to project in the circumferential direction on the outside of the moving blade body 12 in the radial direction. A surface of the shroud 13 directed outward in the radial direction is an outer circumferential surface 13a of the shroud 13.

Figure 3:
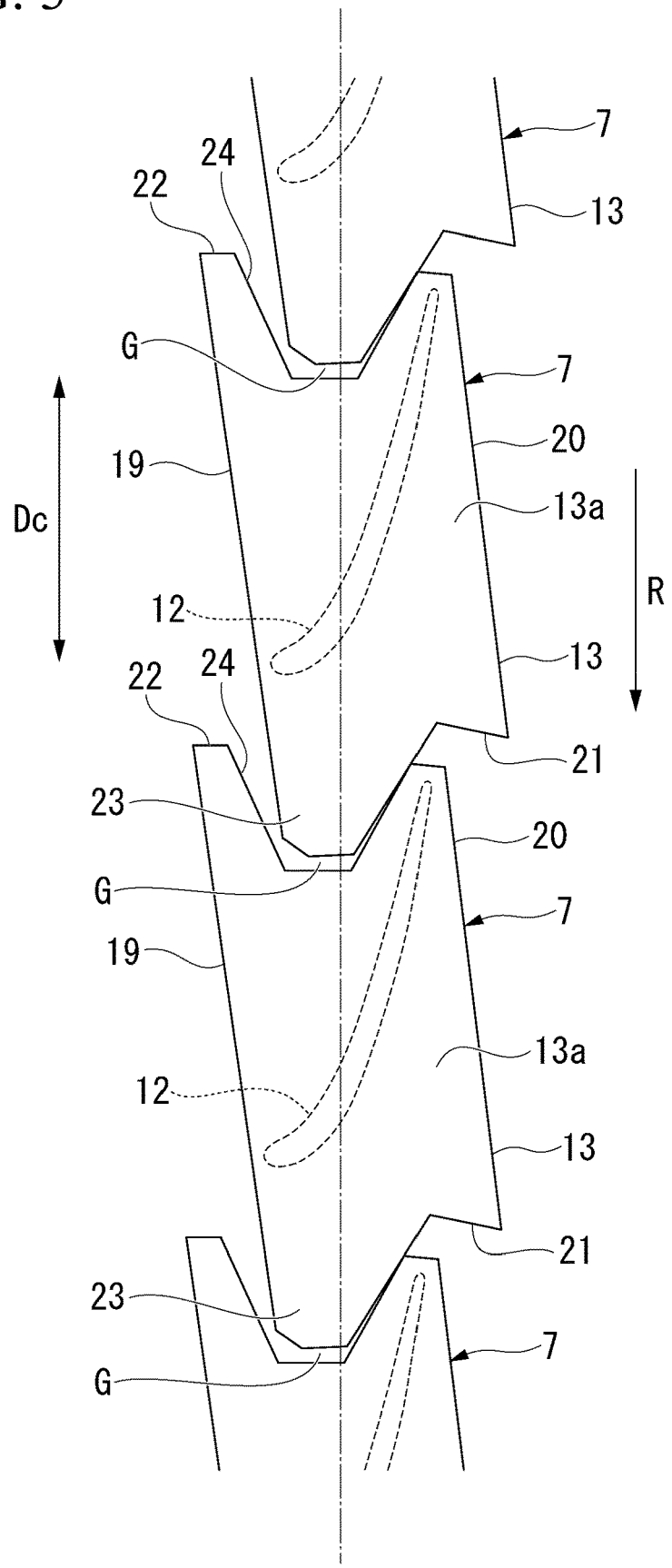
FIG. 3 is a view of a moving blade stage of the first embodiment of the present invention when viewed from the outside in the radial direction.

As shown in FIG. 3, each of the shrouds 13 is disposed so as to be adjacent to each other and partially abut against each other in a circumferential direction Dc of the axis A (refer to FIG. 2). In other words, the shroud 13 is pressed against the shroud 13 of the other moving blade 7 adjacent thereto in the circumferential direction Dc.

In the shroud 13, a surface that is oriented to the upstream side and extends along the circumferential direction Dc is an upstream side end surface 19, and a surface that is oriented to the downstream side and extends along the circumferential direction Dc is a downstream side end surface 20.

Further, in the shroud 13, a surface on one side in the circumferential direction Dc and oriented toward a front side in a rotational direction R is a first circumferential direction end surface 21, and a surface on the other side in the circumferential direction Dc and oriented toward a rear side in the rotational direction R is a second circumferential direction end surface 22.

A projection portion 23 is formed on the first circumferential direction end surface 21. In the second circumferential direction end surface 22, a recess portion 24 that corresponds to the projection portion 23 formed on the first circumferential direction end surface 21 is formed.

A gap G provided in consideration of deformation of the shroud 13 during the operation, is provided between the shrouds 13 adjacent to each other.

As shown in FIG. 2, the displacement sensor 14 is provided on the outside of the shroud 13 in the radial direction so as to face the shroud 13. The displacement sensor 14 is fixed to the casing 3 (refer to FIG. 1) on a stationary side. The number of displacement sensors 14 is the same as the number of moving blades 7, but is not limited thereto.

The displacement sensor 14 is an eddy current type displacement sensor that is configured to calculate a distance to the shroud 13 that is a calculation object. The displacement sensor 14 is not limited to an eddy current type, but can be a sensor that can calculate displacement without contact, such as a laser type or an ultrasonic type.

Although FIG. 2 shows the displacement sensor 14 disposed for one moving blade stage 6, the displacement sensor 14 may be similarly arranged for the other moving blade stage 6. The displacement sensor 14 is connected to the analysis device 11 of the blade vibration monitoring system 101 via an electric signal cable.

The blade vibration monitoring device 100 includes a rotation sensor 17 that detects one rotation of the rotating shaft 2. The rotation sensor 17 detects one rotation of the rotating shaft 2 and outputs a predetermined pulse wave that indicates the detection time.

Next, the detailed shape of the shroud 13 of the present embodiment will be described.

Figure 4:
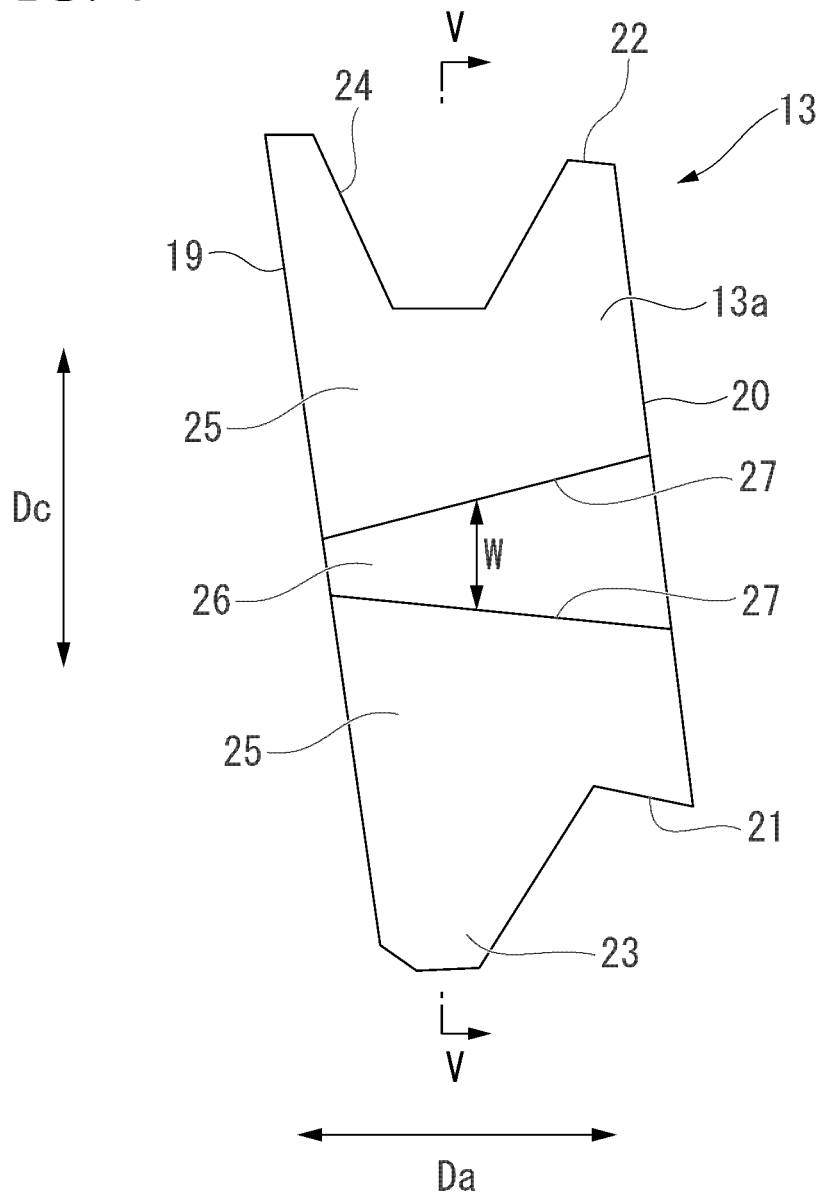
FIG. 4 is a view of a shroud of the first embodiment of the present invention when viewed from the outside in the radial direction.

As shown in FIG. 4, the outer circumferential surface 13a of the shroud 13 has a first surface 25 and a second surface 26 disposed so as to be interposed between the first surfaces 25 from both sides in the circumferential direction Dc. The second surface 26 has a strip shape that extends in the axial direction Da in the vicinity of the center of the shroud 13 in the circumferential direction Dc. The second surface 26 extends from the upstream side end surface 19 of the shroud 13 to the downstream side end surface 20.

The second surface 26 is formed such that the width in the circumferential direction Dc gradually increases toward one side (downstream side) in the axial direction Da. In other words, a pair of boundary lines 27 between the first surface 25 and the second surface 26 is a straight line, and the pair of boundary lines 27 are inclined so as to be separated from each other toward one side in the axial direction Da. The second surface 26 is formed such that an interval (hereinafter, referred to as a second surface width W) in the circumferential direction Dc between the pair of boundary lines 27 is a predetermined length or more.

Figure 5:
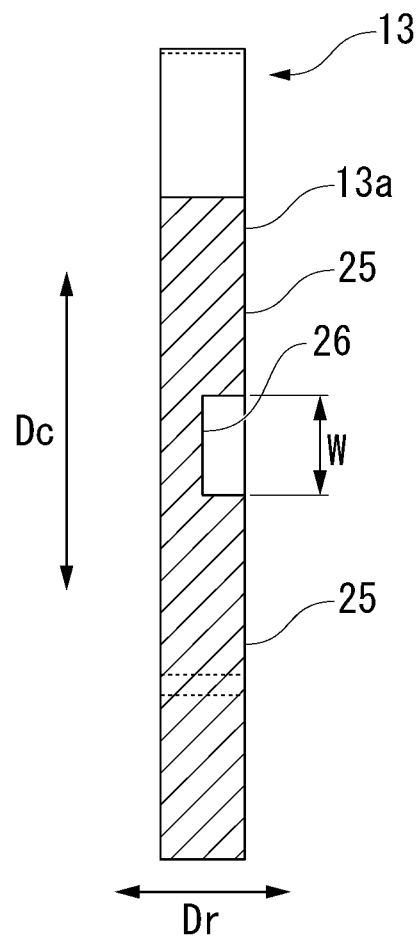
FIG. 5 is a sectional view taken along line V-V of FIG. 4, and is a sectional view of the shroud of the first embodiment of the present invention.

As shown in FIG. 5, the second surface 26 is formed so as to have a height in a radial direction Dr different from that of the first surface 25. The second surface 26 of the present embodiment has a height in the radial direction Dr that is lower than that of the first surface 25. In other words, the thickness of the second surface 26 is thinner than the thickness of the first surface 25. In other words, the second surface 26 is formed such that the detection signal from the displacement sensor 14 is different from that of the first surface 25.

The first surface 25 and the second surface 26 of all the shrouds 13 that configure one moving blade stage 6 have the same shape.

The analysis device 11 includes a storage unit 11a, and a calculation unit 11b that calculates a vibration amount of the shroud 13 based on the detection signal from the displacement sensor 14, that is, the distance between the displacement sensor 14 and the shroud 13.

In the storage unit 11a of the analysis device 11, a relationship between a length (second surface width W) of the second surface 26 in the circumferential direction Dc that passes through the inside of the displacement sensor 14 in the radial direction, and a position of the shroud 13 in the axial direction Da, is stored.

The operation of the turbine 1 configured as described above will be described.

In operating the turbine 1, first, high-temperature and high-pressure steam supplied from a steam supply source (not shown) such as a boiler is introduced into the casing 3 through the intake port 9. The steam introduced into the casing 3 sequentially collides with the moving blade 7 (moving blade stage 6) and the turbine vane 5 (turbine vane stage 4).

In each of the turbine vane stages 4, as the steam that has flowed from the upstream side hits the turbine vane 5, a turning component around the rotating shaft 2 is added to the steam flow. Accordingly, the steam flow turns around the rotating shaft 2 on the downstream side of each of the turbine vane stages 4. Each of the moving blade stages 6 reaches the flow of steam that has turned around the rotating shaft 2 via the turbine vane stage 4 on the upstream side. As the steam flow that has turned hits each of the moving blades 7, the rotating shaft 2 obtains rotational energy and rotates around the axis. The rotational movement of the rotating shaft 2 is taken out by a generator or the like (not shown) connected to the shaft end.

The above-described cycle is repeated continuously.

The detection signal detected by the displacement sensor 14 during the operation of the turbine 1 is continuously transmitted to the analysis device 11.

Figure 6:
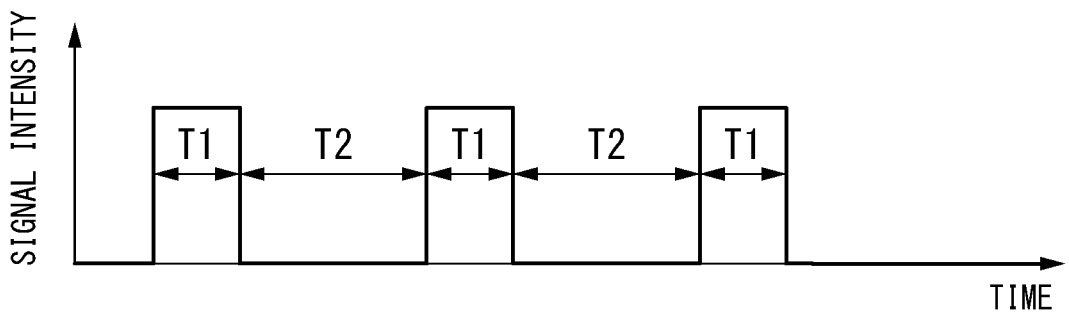
FIG. 6 is a view in which a horizontal axis represents time and a vertical axis represents a detection signal of a displacement sensor.

FIG. 6 is a view in which a horizontal axis represents time and a vertical axis represents a signal intensity of a detection signal of the displacement sensor 14. As shown in FIG. 6, the distance between the displacement sensor 14 which is a detection signal detected by the displacement sensor 14, and the outer circumferential surface of the shroud 13 becomes large when the second surface 26 passes through the inside of the displacement sensor 14 in the radial direction. In a case where the moving blades 7 are provided at equal intervals in the circumferential direction Dc of the rotating shaft 2, the detection signal of the second surface 26 has a waveform that periodically appears. Since the second surface 26 and the first surface 25 have different heights in the radial direction, the detection signal clearly changes.

In a case where the moving blade 7 (shroud 13) does not vibrate in the circumferential direction Dc and the axial direction Da, a time width T1 (the length of time for the second surface 26 to pass through the inside of the displacement sensor 14 in the radial direction) of the second surface 26, and a time width T2 (the length of time for the first surface 25 to pass through the inside of the displacement sensor 14 in the radial direction) of the first surface 25, are respectively constant.

The manager can monitor the vibration generated in the moving blade 7 based on the change of the time width T1 and the time width T2.

In a case where the moving blade 7 vibrates in the circumferential direction Dc, the time width T2 changes.

The calculation unit of the analysis device 11 calculates the vibration amount of the shroud 13 based on the time width T2. The calculation unit calculates the vibration amount of the shroud 13 from a circumferential speed Vr of the shroud 13 and the time width T2.

In a case where the moving blade 7 vibrates in the axial direction Da, the time width T1 changes. In other words, by forming the second surface width W so as to gradually increase toward one side in the axial direction Da, the time width T1 changes depending on the position of the shroud 13 in the axial direction Da.

The calculation unit of the analysis device 11 calculates the second surface width W based on the time width T1. When the circumferential speed of the shroud 13 is Vr, the second surface width W can be calculated by Vr×T1. Next, the position of the shroud 13 in the axial direction Da (the vibration amount in the axial direction Da) can be specified by using the relationship between the second surface width W stored in the storage unit 11a and the position of the shroud 13 in the axial direction Da.

Further, the storage unit 11a of the analysis device 11 can store calibration data acquired in advance by a factory test or the like. The data for calibration is, for example, the relationship between the calculated time width T1 at a predetermined circumferential speed and the length of the second surface 26 in the circumferential direction Dc that has passed through the inside of the displacement sensor 14 in the radial direction.

In this manner, even in a case where the detection signal becomes unclear due to the low frequency characteristics of the sensor by storing the calibration data in the storage unit, the vibration amount can be predicted by comparing the detection signal with the calibration data.

Further, by inclining the boundary line 27 between the first surface 25 and the second surface 26, the time width measured by the displacement sensor 14 when the shroud 13 moves in the axial direction Da is increased, and the sensitivity can be improved.

Figure 7:
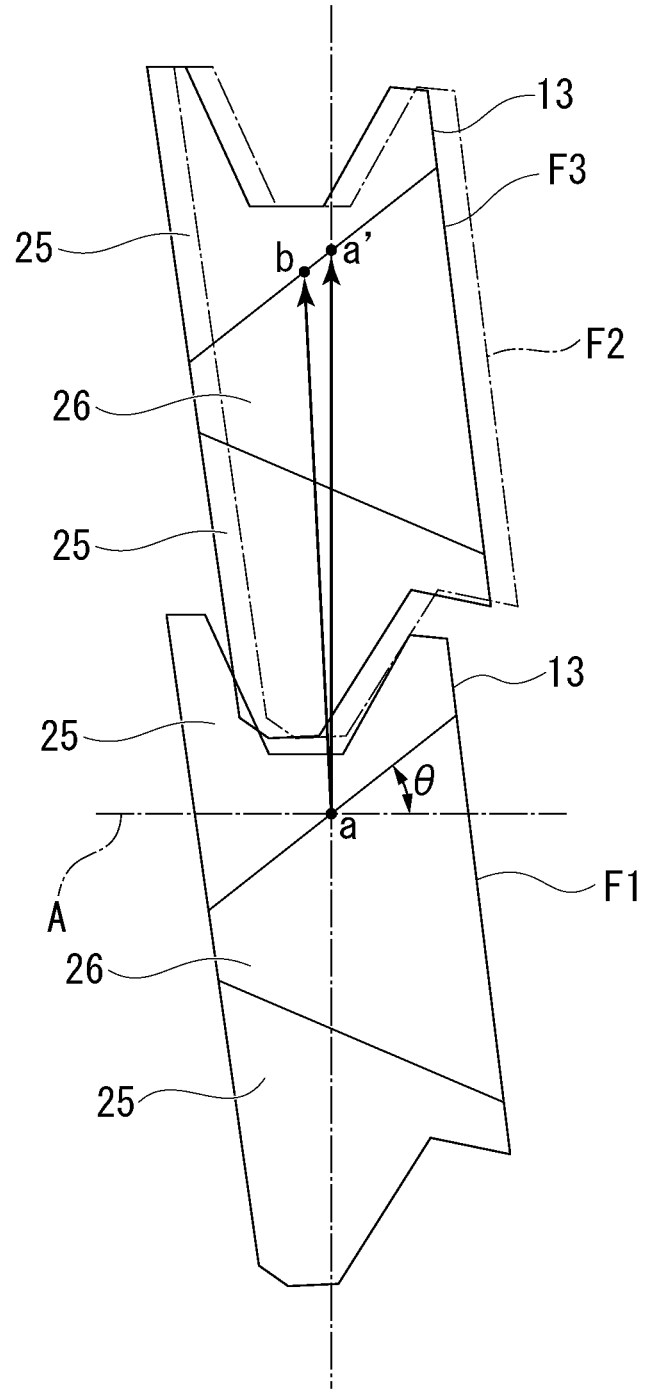
FIG. 7 is a view showing the moving blade stage when viewed from the outside in the radial direction, and is a view showing a signal width in a case where the shroud vibrates in the axial direction.

FIG. 7 is a view showing the moving blade stage 6 when viewed from the outside in the radial direction, and is a view showing a signal width in a case where the shroud 13 vibrates in the axial direction Da.

In FIG. 7, a shroud F2 indicated by the one-dot chain line does not vibrate in the axial direction Da with respect to a shroud F1 which is a reference. A shroud F3 indicated by the solid line does not vibrate in the axial direction Da with respect to the shroud F1 which is a reference. FIG. 7 shows the position of the shroud in the case. In FIG. 7, the shape of the second surface 26 and the vibration amount of the shroud are exaggerated in order to clarify the effect.

Figure 8:
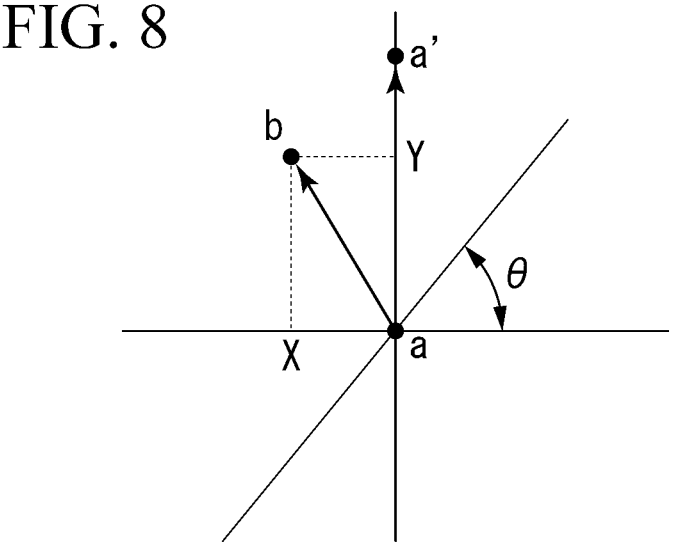
FIG. 8 is a view showing a signal width in a case where the shroud vibrates in the axial direction.

Here, an actual amplitude of the shroud is a distance of a line segment ab, but a sensor measurement amplitude measured by the displacement sensor 14 is a distance of a line segment aa'. As shown in FIG. 8, the line segment aa' can be calculated by the following Equation (1). θ is an angle of the boundary line 27 between the first surface 25 and the second surface 26 with respect to the axis A. X and Y are components of the actual amplitude of the shroud 13.

$$aa' = Y + X \tan\theta \qquad (1)$$

In this manner, by inclining the boundary line 27 with respect to the axis A, the sensor measurement amplitude aa' measured by the displacement sensor 14 can be made larger than the actual amplitude ab. Accordingly, the sensitivity of the blade vibration monitoring device 100 can be improved.

According to the present embodiment, since the detection signals detected by the displacement sensor 14 are different from each other between the first surface 25 and the second surface 26 of the shroud 13, compared to the method for detecting the gap G between the shrouds 13, it is possible to stably perform measurement of vibration of the moving blade 7 having the shroud 13.

In addition, the shroud 13 of the present embodiment makes the detection signal from the displacement sensor 14 different from each other between the first surface 25 and the second surface 26 by making the height in the radial direction of the first surface 25 and the second surface 26 different from each other. Accordingly, it is possible to more easily form a structure in which the detection signals from the displacement sensor 14 are different from each other between the first surface 25 and the second surface 26.

Further, the vibration amount of the shroud 13 in the circumferential direction Dc can be calculated based on the length of time for the first surface 25 to pass through the inside of the displacement sensor 14 in the radial direction.

In addition, as the second surface 26 is formed such that the width in the circumferential direction Dc gradually increases toward one side in the axial direction Da, the vibration amount of the shroud 13 in the axial direction Da can be calculated based on the length of time for the second surface 26 to pass through the inside of the displacement sensor 14 in the radial direction.

Further, since the calculation position of the shroud 13 by the displacement sensor 14 can be grasped based on the second surface width W, the measurement position can also be reflected in the review of the limit value and safety factor in blade vibration monitoring.

Second Embodiment

Hereinafter, a blade vibration monitoring device of a second embodiment of the present invention will be described in detail with reference to the drawings. In addition, in the present embodiment, differences from the above-described first embodiment will be mainly described, and the description of similar parts will be omitted.

Figure 9:
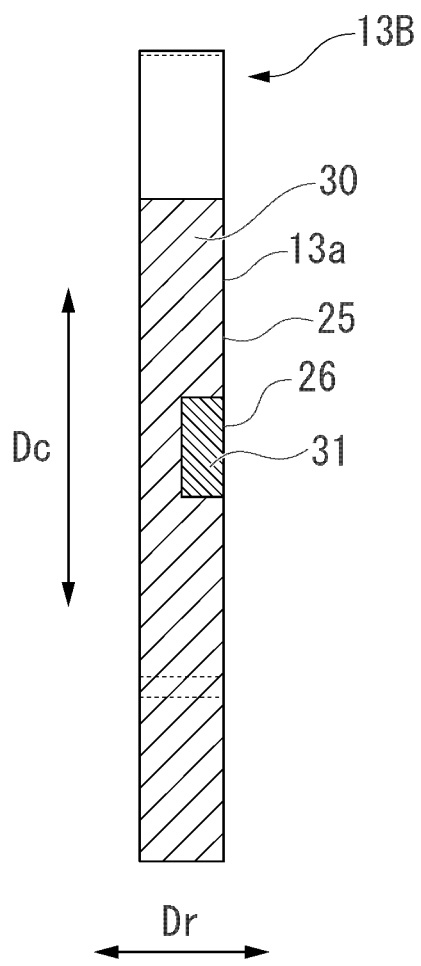
FIG. 9 is a sectional view of a shroud of a second embodiment of the present invention.

As shown in FIG. 9, a shroud 13B of the present embodiment includes a shroud body 30 and a dissimilar metal portion 31 embedded in the shroud body 30. The shape of the dissimilar metal portion 31 viewed from the outside in the radial direction is the same as the shape of the second surface 26 of the first embodiment. The second surface 26 of the present embodiment is a surface of the dissimilar metal portion 31 embedded in the shroud body 30. The outer circumferential surface of the shroud 13B is formed such that the first surface 25 and the second surface 26 are on the same plane (on the same curved surface).

The sensor of the present embodiment is an electric field sensor that can detect an object in the electric field in a non-contact manner by generating the electric field. Accordingly, the detection signals from the sensor are different from each other between the first surface 25 and the second surface 26.

According to the present embodiment, an outer circumferential surface 13a of a shroud 13B can be made flat. Accordingly, disturbance of the working fluid can be suppressed. Further, the second surface 26 can be detected using the sensor that can detect the object in the electric field by generating the electric field.

In the above-described embodiment, a configuration in which the dissimilar metal portion 31 having a predetermined thickness is embedded is employed, but the invention is not limited thereto, and a tape formed of a metal material different from the material of the shroud body 30 may be put on.

Third Embodiment

Hereinafter, a blade vibration monitoring device of a third embodiment of the present invention will be described in detail with reference to the drawings. In addition, in the present embodiment, differences from the above-described first embodiment will be mainly described, and the description of similar parts will be omitted.

Figure 10:
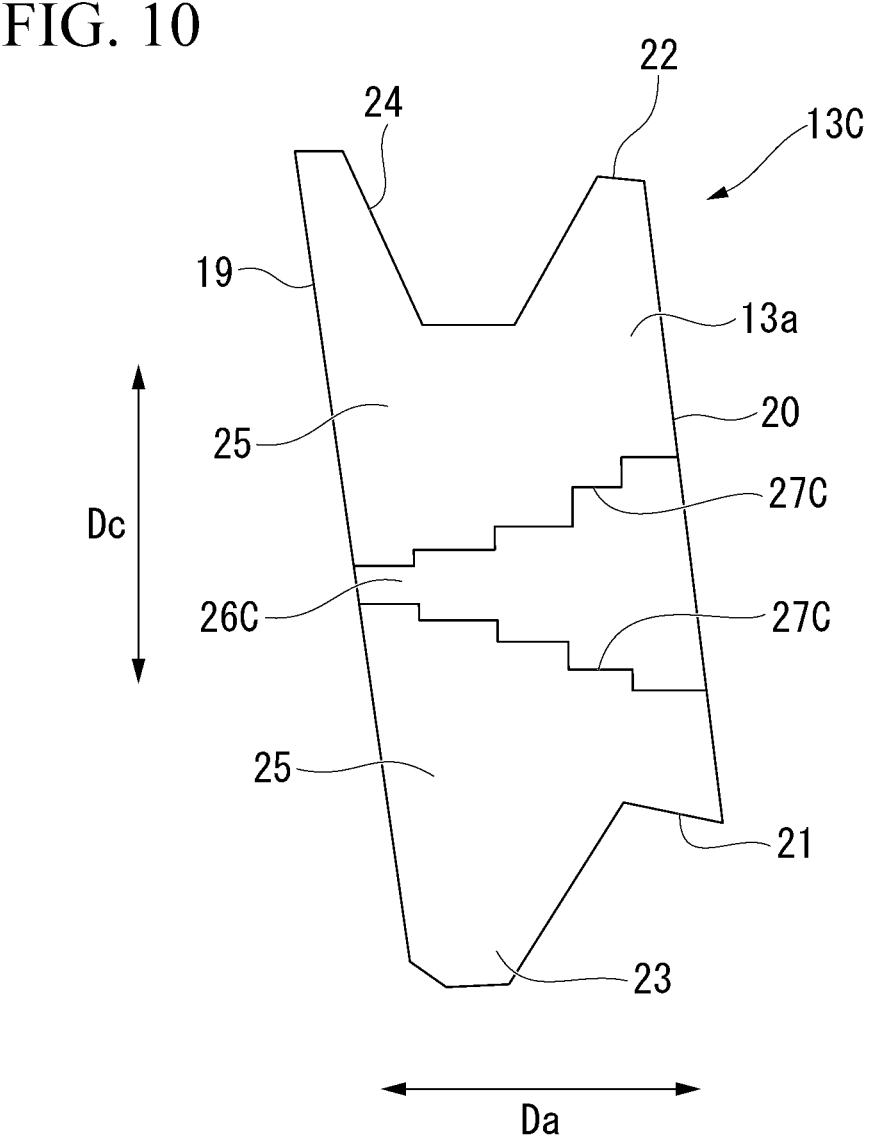
FIG. 10 is a view of a shroud of a third embodiment of the present invention when viewed from the outside in the radial direction.

As shown in FIG. 10, a second surface 26C of the present embodiment is formed such that the width in the circumferential direction Dc increases stepwise toward one side in the axial direction Da. In other words, a boundary line 27C between the first surface 25 and the second surface 26C is formed in a step shape.

According to such a configuration, the position of the shroud 13C in the axial direction Da can be specified based on the length of time for the second surface 26 to pass through the inside of the sensor in the radial direction. In addition, the length of time for the second surface 26C to pass through the inside of the sensor in the radial direction can be changed discretely.

Fourth Embodiment

Hereinafter, a blade vibration monitoring device of a fourth embodiment of the present invention will be described in detail with reference to the drawings. In addition, in the present embodiment, differences from the above-described first embodiment will be mainly described, and the description of similar parts will be omitted.

Figure 11:
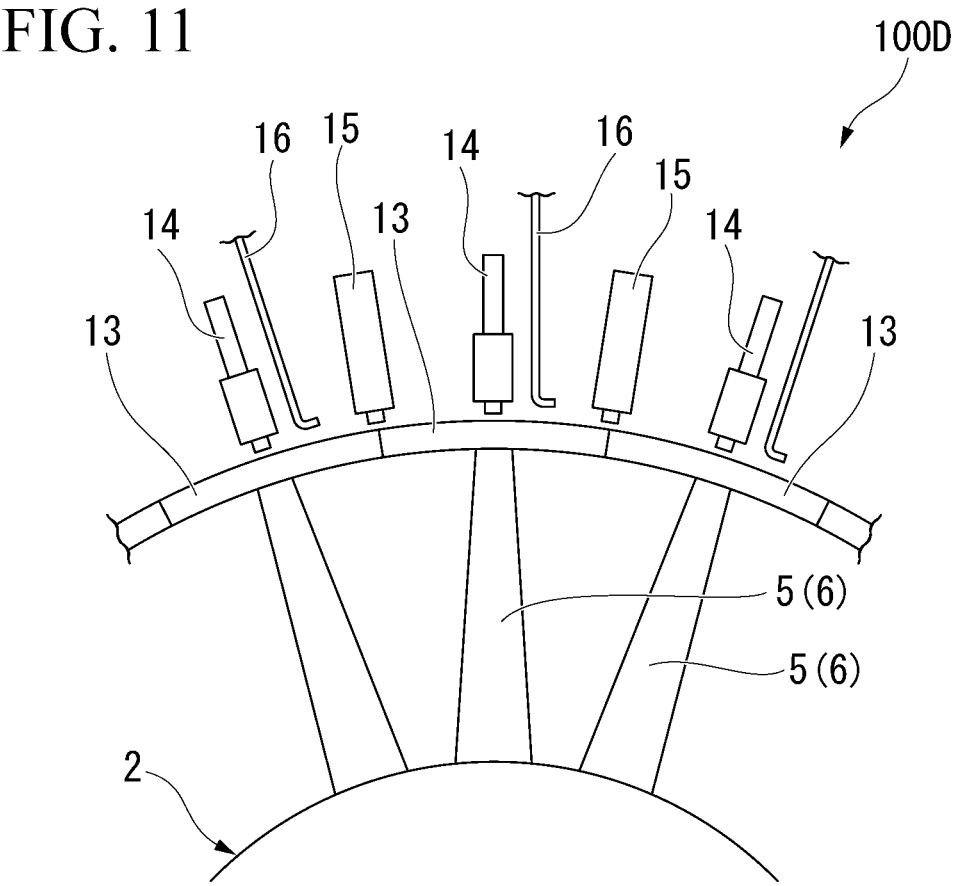
FIG. 11 is a view of a blade vibration monitoring system of a fourth embodiment of the present invention when viewed in the axial direction.

As shown in FIG. 11, a blade vibration monitoring device 100D of the present embodiment includes a laser sensor 15 disposed at the same position in the axial direction as the displacement sensor 14, a purge air supply device 16 that cleans the tip of the laser sensor 15. The laser sensor 15 is an optical sensor that irradiates laser light and detects reflected light that is reflected from the outer circumferential surface of the shroud 13.

Since the laser sensor 15 has high frequency characteristics, it is possible to accurately measure the second surface width W (refer to FIG. 4) of the shroud 13 that passes at a higher speed than the eddy current type displacement sensor or the like.

There is a possibility that the laser sensor 15 is affected by steam in the environment of the steam turbine and a signal failure is caused, but the laser sensor 15 is intended to detect the second surface width W, and thus, it is not always important to be capable of stably performing the measurement that much. In other words, it is only necessary to be capable of performing the measurement for a short period of time, and it is possible to perform a certain evaluation when it is possible to excellently obtain only a few detection signals instead of all the moving blades 7 (the shroud 13). Accordingly, only when the signal of the laser sensor 15 is malfunctioning, it is ideal to have a structure in which purge air is blown into the tip of the sensor to clean the tip of the sensor and the signal can be acquired only for a short period of time. Since the purge air is blown only for a short period of time, the influence on the turbine 1 can be minimized.

Above, the embodiments of the present invention have been described in detail with reference to the drawings, but the specific configuration is not limited to the embodiments, and includes design changes and the like within a scope not departing from the gist of the present invention.

In the above-described embodiments, the second surface 26 is formed such that the width in the circumferential direction gradually increases toward the downstream side in the axial direction, but the present invention is not limited thereto, and the second surface 26 may be formed such that the width in the circumferential direction decreases stepwise toward the downstream side in the axial direction.

The blade vibration monitoring device and the blade vibration monitoring system of the above-described embodiments are technologies that can be used without distinction for rotary machines such as steam turbines and gas turbines.

REFERENCE SIGNS LIST

1 turbine
2 rotating shaft
3 casing
4 turbine vane stage
5 turbine vane
6 moving blade stage
7 moving blade
8 bearing device
9 intake port
10 exhaust port
11 analysis device
12 moving blade body
13 shroud
13a outer circumferential surface
14 displacement sensor
15 laser sensor
16 purge air supply device
17 rotation sensor
19 upstream side end surface
20 downstream side end surface
21 first circumferential direction end surface
22 second circumferential direction end surface
23 projection portion
24 recess portion
25 first surface
26 second surface
27 boundary line
30 shroud body
31 dissimilar metal portion
100 blade vibration monitoring device
101 blade vibration monitoring system
A axis
Da axial direction
Dc circumferential direction
Dr radial direction
G gap

What is claimed is:

1. A blade vibration monitoring system comprising:
a rotary machine including a rotating shaft extending along an axis, and a plurality of moving blades having a plurality of moving blade bodies that extend radially outward in a radial direction from the rotating shaft, and shrouds that are provided at tips of the moving blade bodies, respectively, and are in contact with each other in a circumferential direction, wherein an outer circumferential surface of each shroud has
  first surfaces separated from each other in a circumferential direction about the axis, and
  a second surface which is interposed between the first surfaces, the second surface being defined by two boundary lines between the first surfaces and the second surface, wherein the two boundary lines extend from a first edge of the shroud to an opposite second edge of the shroud in a direction of the axis, and the two boundary lines are linearly inclined with respect to the direction of the axis and extend away from each other toward one side in the direction of the axis;
a sensor that is provided on an outside of one of the shrouds in the radial direction to face the shroud, and is configured to detect a length of time for the second surface to pass through an area inward of the sensor in the radial direction when the shroud is rotated; and
an analysis device which stores a relationship between a width of the second surface in the circumferential direction and a position of the shroud in the direction of the axis, and that is configured to calculate the width of the second surface of the shroud in the circumferential direction, which is a length of the second surface in the circumferential direction that passes through the area inward of the sensor in the radial direction, by multiplying the length of time for the second surface to pass through the area inward of the sensor in the radial direction by a circumferential speed of the shroud,
wherein the analysis device specifies the position of the shroud in the direction of the axis corresponding to the calculated width of the second surface of the shroud in the circumferential direction using the stored relationship.

* * * * *